F. M. BLAKE.
BALE-TIE.
No. 192,730. Patented July 3, 1877.
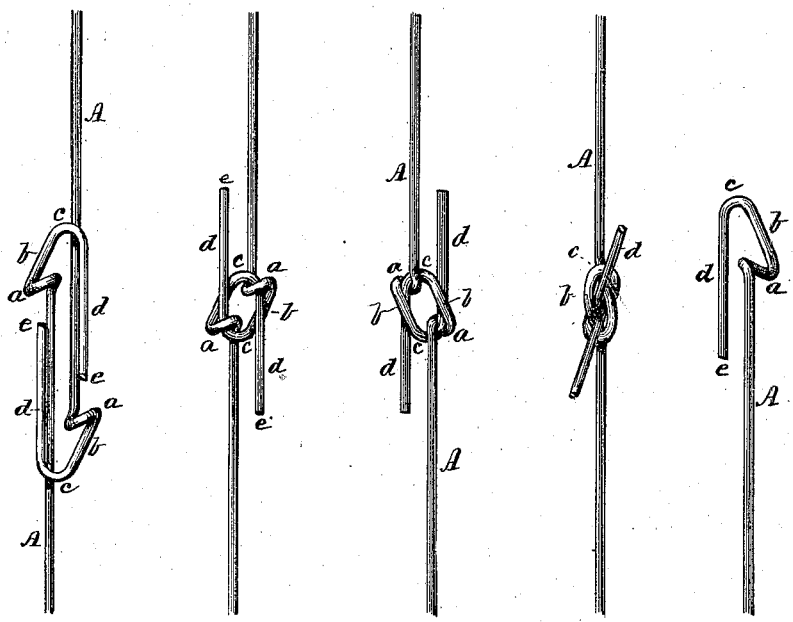
Witnesses
J. E. Lewis
Chas. R. Hildreth
Inventor
Francis M. Blake
By Chas. H. Burleigh
Atty.

UNITED STATES PATENT OFFICE.

FRANCIS M. BLAKE, OF WORCESTER, MASSACHUSETTS.

IMPROVEMENT IN BALE-TIES.

Specification forming part of Letters Patent No. 192,730, dated July 3, 1877; application filed May 31, 1877.

*To all whom it may concern:*

Be it known that I, FRANCIS M. BLAKE, of the city and county of Worcester and State of Massachusetts, have invented certain new and useful Improvements in Bale-Ties; and I declare the following to be a description of my said invention sufficiently full, clear, and exact to enable others skilled in the art to which my invention belongs to make and use the same, reference being had to the accompanying drawings, which form a part of this specification, and in which—

Figure 1 represents a front view of the ends of a bale-tie constructed in accordance with my invention, shown in a position preparatory to locking. Fig. 2 is a similar view with the ends locked; Fig. 3, a back view with the ends locked. Fig. 4 is a front view, showing the effect of severe strain on the tie. Fig. 5 is a rear view of one end. Fig. 6 is a side view of one end. Fig. 7 is a sectional view at line $x\ x$, Fig. 6, and Fig. 8 shows a modification.

My invention consists in a wire bale-tie, the ends of which are constructed and arranged for interlocking in the peculiar manner hereinafter described.

In my improved bale-tie the ends of the wire are both of similar shape, and are formed substantially as follows: The wire A is bent to a three-quarter turn (more or less) to form an eye or loop, $a$, which projects outward or above the line of the main wire, and stands in position transversely or diagonal to the axis of said main wire, while beyond said loop $a$ the wire is carried forward at a slight inclination, as at $b$, for a short distance, and is then bent back with a short turn, as at $c$, and its end portion $d$ returned along the main wire A in a position parallel, or nearly so, with said main wire A, and at a short distance from it, the extremity $e$ being some distance back from the line of loop $a$.

To lock the ends with each other they are placed in position, as shown in Fig. 1, and then drawn together, as shown in Figs. 2 and 3; the portions $d$ passing through the eyes or loops $a$, which latter stop against the bends $c$, as illustrated.

When severe strain is put on the tie sufficient to straighten the wire, the ends are drawn into a close knot, similar to Fig. 4.

It will be observed that the strain of the band-wire acts across the loop $a$ in a manner similar to the strain on a coiled-wire spring, and thus tends to uncoil said loop and tighten the parts $b$ down upon the portions $d$, instead of closing the loop $a$ and breaking the wire.

The bale-tie constructed as above described is simple, easy of manufacture, and can be quickly secured on the bale, and cannot be unlocked by strain on the band-wire.

The loop $a$ may be made with two or more turns, if desired, as in Fig. 8, but I prefer the form described.

What I claim as my invention, and desire to secure by Letters Patent, is—

1. A wire bale-tie, having its ends formed, as herein set forth, with transverse eyes or loops $a$, bends $b$ and $c$, and returned ends $d\ e$, arranged for interlocking with each other in the peculiar manner shown and described.

2. In a bale-tie, the combination, with returned ends $d$, of transversely or diagonally-arranged loops $a$, whereby, when the tie is severely drawn, the strain, by uncoiling said loops, presses inward the ends $d$ in the peculiar manner substantially as herein set forth.

FRANCIS M. BLAKE.

Witnesses:
CHAS H. BURLEIGH,
S. E. BARTON.